UNITED STATES PATENT OFFICE.

IGNAZ ROSENBERG AND BRUNO HELMERT, OF BIEBRICH, GERMANY, ASSIGNORS TO KALLE & CO., OF SAME PLACE.

ORANGE-BROWN POLYAZO DYE.

SPECIFICATION forming part of Letters Patent No. 613,643, dated November 1, 1898.

Application filed December 27, 1897. Serial No. 663,476. (No specimens.)

*To all whom it may concern:*

Be it known that we, IGNAZ ROSENBERG, a subject of the Emperor of Austria-Hungary, and BRUNO HELMERT, a subject of the King of Prussia, Emperor of Germany, doctors of philosophy, residing at Biebrich-on-the-Rhine, Germany, and assignors to KALLE & CO., of same place, have invented certain new and useful Improvements in the Manufacture of Orange-Brown Polyazo Dyestuffs, of which the following is a specification, and which has been patented in France, No. 265,227, dated March 22, 1897.

This invention relates to the manufacture of new polyazo dyestuffs from 1.3.6 naphthalenediaminsulfo-acid.

The 1.3.6 naphthalenediaminsulfo-acid of United States Patent No. 587,757 possesses the remarkable property of combining with two molecules of a diazo body or with one molecule each of two different diazo bodies. In this manner a new series of valuable dyestuffs is produced. Of especially high value are those which are obtained by the action of intermediate products formed by combining the tetrazo compounds of the usually-employed paradiamins with oxycarbonic acids on monoazo colors containing the said 1.3.6 naphthalenediaminsulfo-acid as component part.

It is of no influence upon the character of the dyestuff whether the preparation of the monoazo color is effected by the action of the diazo compound upon the naphthalenediaminsulfo-acid in acid or in alkaline reaction liquid.

In order to carry out our invention we proceed, for instance, as follows: 9.3 kilos anilin are dissolved with twenty-eight kilos of strong hydrochloric acid and five hundred liters of water and diazotized, after cooling with five hundred kilos of ice, by means of 6.9 kilos sodium nitrate. The so-obtained diazo solution is run into a cooled solution of 23.8 kilos 1.3.6 naphthalenediaminsulfo-acid and twenty-five kilos soda-ash in one thousand liters of water. After the formation of the monoazo color is completed we add to the reaction liquid the intermediate product obtained from 18.4 kilos benzidin and 13.8 kilos salicylic acid in the usual manner. After ten hours' stirring the mass is heated up and the dyestuff is salted out, filtered, pressed, and dried. It represents a brown crystalline powder, easily soluble in water, more difficultly soluble in alcohol, with orange-yellow coloration.

The solution of the dyestuff in concentrated sulfuric acid is reddish violet, and by adding water to it the free acid of the coloring-matter separates out as a fine precipitate.

The dyestuff dyes unmordanted cotton a fast orange-brown shade from baths prepared with alkali or salt, and it also dyes mixed goods in a neutral bath.

Instead of anilinsulfanilic acid or amidonaphtolsulfo-acid (G) or amidosalicylic acid can be used. The shades of these dyestuffs vary from yellowish brown to reddish brown. By treating the dyed fibers in the usual manner with metallic salts metallic lakes are formed on the fibers.

What we claim is—

1. The process of producing new polyazo dyestuffs by combining monoazo colors containing the 1.3.6 naphthalenediaminsulfo-acid as component part with the intermediate products obtained from one molecule of one of the usually-employed paradiamins and one molecule of an oxycarbonic acid.

2. The process of producing the specific polyazo dyestuff by combining the monoazo color from one molecule of diazo-benzene and one molecule of 1.3.6 naphthalenediaminsulfo-acid with the intermediate product from one molecule of tetrazo-diphenyl and one molecule of salicylic acid in the manner hereinbefore described.

3. As a new product of manufacture the polyazo dyestuff derivable from 1.3.6 naphthalenediaminsulfo-acid which exists as a brown crystalline powder easily soluble in water, more difficultly soluble in alcohol with orange-yellow coloration, giving a reddish-violet solution with sulfuric acid, from which solution the free acid of the coloring-matter separates out on addition of water as a fine precipitate, and which dyes unmordanted cotton a fast orange-brown shade from baths prepared with alkali or salt and also dyes mixed goods from a neutral bath.

In testimony whereof we have signed our names to this specification in the presence of two subscribing witnesses.

IGNAZ ROSENBERG.
     BRUNO HELMERT.

Witnesses:
 C. REINHARD,
 JACOB ADRIAN.